United States Patent [19]

Perkins

[11] 3,854,291

[45] Dec. 17, 1974

[54] SELF-CLEANING FILTER FOR HYDROLOGICAL REGENERATION

[76] Inventor: Earl Stuart Perkins, 3207 York Rd., Oak Brook, Ill. 60521

[22] Filed: Dec. 26, 1972

[21] Appl. No.: 318,099

[52] U.S. Cl............................ 61/2, 61/18, 61/30, 210/170
[51] Int. Cl............................................ E02b 8/02
[58] Field of Search........ 61/2, 18, 30, 32; 210/170, 210/275

[56] References Cited
UNITED STATES PATENTS

| 779,703 | 1/1905 | Gardner | 210/170 |
|---|---|---|---|
| 779,703 | 1/1905 | Gardner | 210/170 |
| 802,183 | 10/1905 | Dubrow | 210/170 |
| 1,995,367 | 3/1935 | Stewart | 210/170 |
| 3,246,757 | 4/1966 | Martin | 210/124 X |
| 3,713,542 | 1/1973 | Shaler et al. | 61/32 X |

Primary Examiner—Charles N. Hart
Assistant Examiner—Robert G. Mukai
Attorney, Agent, or Firm—Hill, Gross, Simpson, Van Santen, Steadman, Chiara & Simpson

[57] ABSTRACT

Apparatus for filtering and hydrologically regenerating streams comprising dams formed with filters for receiving pollutants which are passed through the filter and then into the holding basin upstream of the dam, before passing through conduits which carries the fluid through the dam. These conduits are normally open, but under conditions of unusual large quantities of fluid, as for example during heavy rains, the dam pass-through conduits close, and the water passes over the top of the dam. At certain periods when the pass-through conduits are closed and the level in the holding tank above the dam is higher than that in the filter chamber, the fluid passes up through the filter to backwash it, so that it is periodically cleaned and thus increases its efficiency and filtering ability.

6 Claims, 3 Drawing Figures

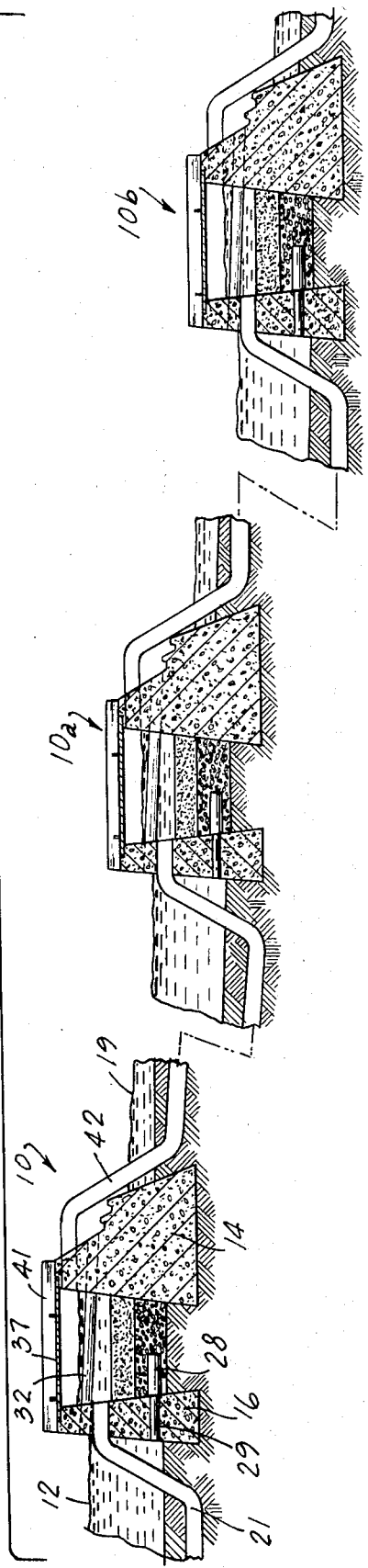
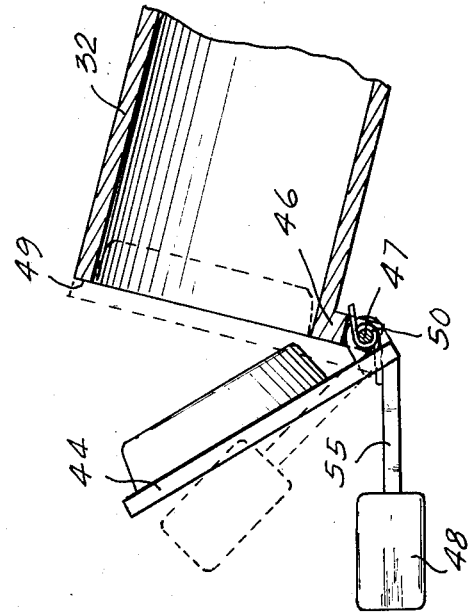

SELF-CLEANING FILTER FOR HYDROLOGICAL REGENERATION

BACKGROUND OF THE INVENTION

1. Field of the Invention

This invention relates in general to water purification apparatus and methods and in particular to an improved dam system wherein poluted water is filtered and the filter is periodically cleaned by automatic backwash due to varying levels of the stream.

2. Prior Art

Many streams, creeks, and rivers have deteriorated from clear, rapidly flowing streams to contaminated eyesores. Thus, the beautiful and clean streams of yesterday have been turned by man into a source of pollution and health hazard. For tens of thousands of years silting and contamination of streams was not a lasting problem, in that the stream beds were deepened due to washing action particularly during periods of high rainfall. However, during the last one hundred and fifty years the clearing of land and plowing of the fields has resulted in erosion, thus allowing tremendous quantities of silt to build up in the stream beds. Also the plowing of land has removed the plants which naturally held the water and broke up its flow, so as to reduce erosion. One of the results has been to create a vicious cycle wherein during floods a stream is not capable of carrying as much water as it used to and thus flooding of surrounding areas occurs, whereas during dry periods the stream becomes merely a trickle which is primarily composed of the outlet of the discharge of many sewers feeding into the present streams.

SUMMARY OF THE INVENTION

The present invention provides for a plurality of holding dams mounted in a stream and in which each holding dam is formed with a filter portion which receives the principle polluted liquids carried by water tight sewage conduits, which are placed under the stream bed and extend between dams and with feeder sewers supplying pollutants to the main sewer line. The sewer conduit supplies its output to a gravity feed filter formed in the dam between its upstream and downstream edges such that the polluted fluids pass through the filter and into conduits which deliver it into the holding pool above the upstream side of the dam. Discharge conduits extend from the holding pool on the upstream side of the dam to the dam and discharge the filtered and purified water to the downstream flow.

During periods of unusually high rainfalls the water in the holding pool rises and reaches a level which will cause the discharge conduits through the dam to close and the water will continue to rise and flow over the top of the dam. As the water recedes the head in the holding pool becomes greater than that in the filter and the water passes through the filter in reverse direction, thus backwashing and cleaning the filter. An output from the filter portion of the dam is provided which connects with the underground sewer conduit for the next section of the stream.

Thus it is seen that the apparatus and system of the invention provides that polluted material rather than passing down the stream passes through underground sewers and is filtered to remove the pollutants before being fed into the holding basin above the dam. Also during periods of unusually heavy rainfall the filters are backwashed and cleaned so as to prepare them for a new cycle.

Other objects, features, and advantages of the invention will be readily apparent from the following description of certain preferred embodiments thereof, taken in conjunction with the accompanying drawings, althrough variations and modifications may be effected without departing from the spirit and scope of the novel concepts of the disclosure, and in which;

BRIEF DESCRIPTION OF THE DRAWINGS

FIG. 2 is a sectional view through three dams showing their arrangement in sequence in a stream, and FIG. 3 is a detailed view illustrating the automatic valve for the flow through conduits of the dam.

DESCRIPTION OF THE PREFERRED EMBODIMENTS

Figure 1:
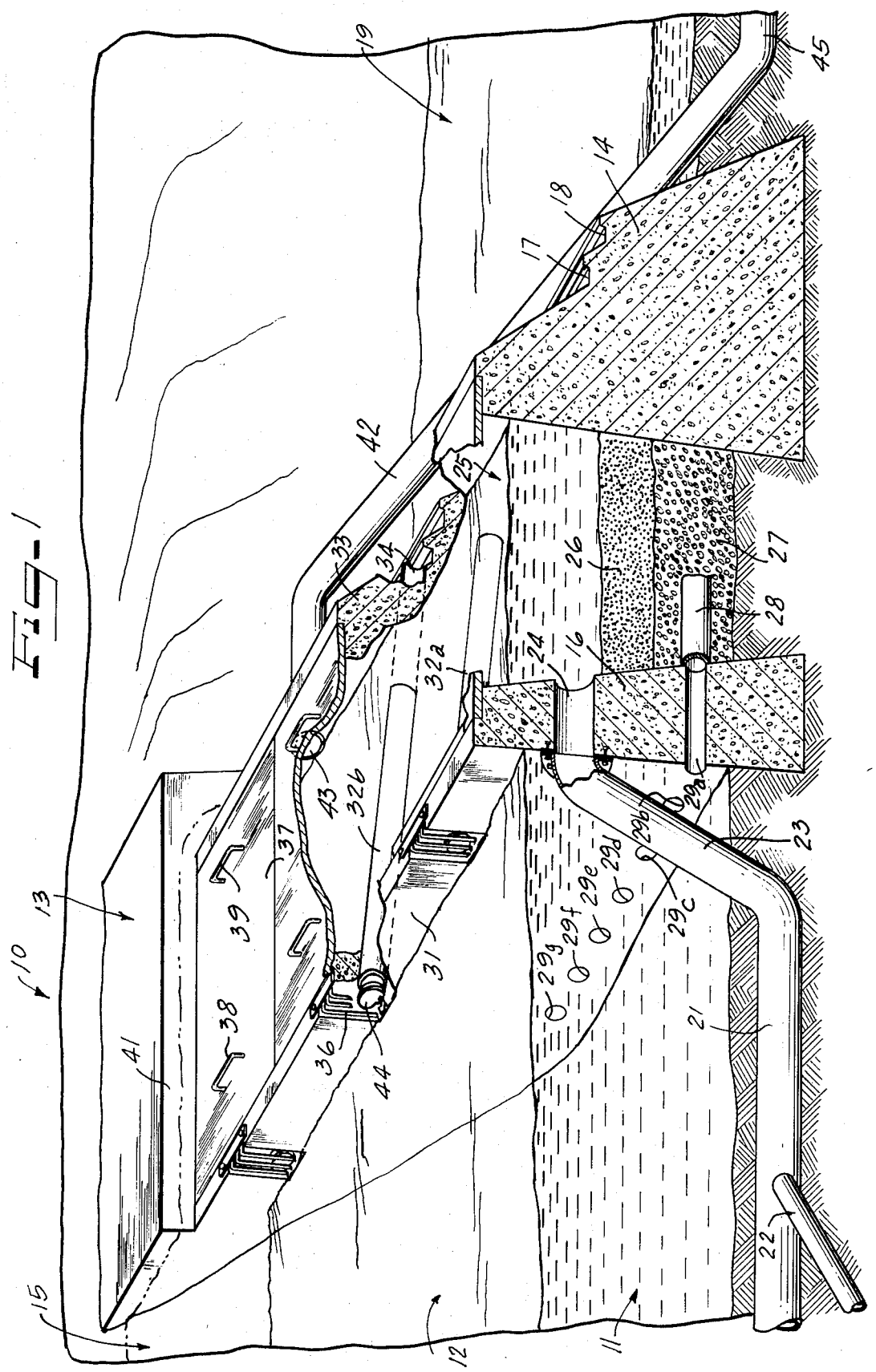
FIG. 1 is a partly perspective sectional view of the dam and filtering system of the invention.

For clearing and removing pollution in streams, a series of dams according to the invention would be installed one after another and the river bed upstream from the dam would be dredged to a constant depth, so as to provide a holding basin behind each dam. For example, if the height of the dams are chosen to be 6 foot, then the water behind a dam on the upstream side might be 5 foot above the footing or 1 foot from the top, and the water level would just reach the footing of the next dam upstream. The normal level of the water retained behind each dam would be no higher than the average water level of the stream before the dams were installed. The river bed upstream from the dam should be dredged to a constant depth of 5 foot, and thus although the water is held behind a series of dams many thousands more cubic feet of water will remain in the river bed at all times. Beneath the dredged river bed are installed a water tight sewer conduit which extends respectively between each pair of dams. The capacity of these sewer conduits need be only slightly greater than the normal flow of water in the stream during the dry season. Each small tributary drainage ditch or sewer outlet between a pair of dams will be directly tied into this underground sewer. A small tributary would require a small dam and a conduit suitable to handle its effluent.

FIG. 1, for example, illustrates the river bed 11 and an underground conduit 21 installed in the river bed and with feeder and auxiliary sewer pipes 22 connected to the sewer conduit 21. A dam 10 is formed with a pair of spaced apart walls 14 and 16 which are separated, for example, by about six feet; and the outlet end of the sewer outlet 21 has an upwardly extending portion 23 which passes through an opening 24, which extends through the dam wall 16 above the river bed 11 and discharges into a filter pool 25. The filter 25 comprises a layer of sand 26 which is spaced above a layer of gravel 27. Tile 28 are spaced in the gravel 27 so as to collect liquid passing through the filter and are connected to conduits 29 which feed from the filter to the upstream side of the wall 16 into the holding pool 12 above the dam 10. The openings 29a – 29g illustrated in FIG. 1 are below the opening 24 of the sewer conduit 21.

A plurality of through conduits 32a, 32b, etc. are mounted between the walls 16 and 14 so as to pass fluid from the holding basin 12 through the dam to downstream 19. Pressure sensitive valves 44 are connected and mounted across the inlets of the pass-through conduits 32 and grill structures 36 are mounted in the wall 16 to prevent foreign matter from passing into the conduits 32 or from jamming the pressure sensitive valves 44.

A plurality of cover plates 37 having lifting handles 38 and 39 extend between the top of walls 16 and 14.

As best shown in FIG. 3 the pressure responsive valves 44 comprise cover members which are pivotally attached to the end of the pass-through conduits 32 by a pivot pin 47 that passes through brackets 46 and 50, respectively connected to the conduit 32 and the valve 44. One form of the pressure sensitive valve 44 may comprise a float 48 connected by a link 55 to the cover 44, such that when the fluid in the holding pool above the dam reaches a certain level the float 48 will move upwardly pivoting the valve 44 to its closed position, as shown in dotted line in FIG. 3. This condition exists during heavy rainfall at which time the water in the holding pool above the dam will rise rapidly, thus closing the valve 44 and the water will then spill over the top of the dam over the cover members 37.

Under periods of extreme heavy rainfall the dam may be completely covered on both the upstream and downstream sides. As the flow decreases the water will quit running over the top of the dam. The valves 44 will remain closed due to the float 48. An outlet sewer opening 43 is formed in the filter 25 and passes through the downstream wall 14 of the dam and is connected to a downstream sewer conduit 42 which is connected to a sewer conduit 45 which extends under the river bed to the next dam downstream. The outlet 43 is positioned such that the fluid level in the filter tank 25 is below the top of the dam wall 16 and thus a head will exist when the fluid level is at the top of wall 16, which will cause fluid to pass through the openings $29a - 29g$ through the tile 28 associated with each of the openings $29a - 29g$ up through the gravel 27 and sand 26 of the filter beds, so as to backwash the filter and such backwash flow will pass out the sewer conduit opening 43 and pass to the next dam section through the underground sewer conduit 45. Such action will continue until the level in the holding basin 12 behind the wall 16 reaches a level where the pressure valve 44 in each of the flow through conduits 32 open, thus allowing the holding basin to drop to the permanent level as determined by the position of the inlets to the flow through conduits 32. When this occurs the backwash through the filter will have been terminated and the filter 25 will again commence to operate with the material from the sewer conduit 21 passing into the filter down through the filter beds 26 and 27, and out the tile 28 and orifices 29 into the upstream holding basin 12.

The downstream side of the wall 14 is provided with aeration troughs 17 and 18 for adding air to the liquid as it flows past the dam.

As illustrated the dam may be formed of concrete and the cover slabs 37 may be formed of concrete or metal as desired. FIG. 2 illustrates a series of three dams in section mounted in a stream with the upstream dam 10 mounted above downstream dams 10a and 10b. Each of the dams has a similar filter, similar inlet sewer connections as well as outlet sewer connections and with pass through pipes having pressure valves mounted therein so as to provide pass through for purified water under normal conditions, and which is closed to backwash the filter when the level in the holding pool reaches a high enough level.

During operation when filtering occurs, the head in the filter 25 is greater than the head in the holding basin 12. This means that the outlet pipe 43 should be higher than the inlet to the pass-through pipes 32. During backwash of the filter the head in the holding tank must be greater than in the filter 25. These conditions are met because the height of the dam is greater than the height of outlet 43.

It is seen that this invention provides apparatus and method for reducing pollution and beautifying streams and although it has been described with respect to preferred embodiments, it is not to be so limited as changes and modifications may be made which are within the full intended scope as defined by the appended claims.

I claim:

1. A system for purifying streams, comprising a dam installed across the river bed of the streams to form a holding pool above the dam, a filter chamber formed in the dam, an inlet sewer pipe sealed from the holding pool connected to the dam to supply input fluid to said filter chamber, filter outlet means extending from the bottom of said filter chamber into said holding pool to normally supply filtered fluid into said holding pool, including pass-through conduit means extending from said holding pool to downstream of said dam and positioned so that the normal head in said holding pool is less than in said filter chamber, including valve means connected to said pass-through conduit means and normally open and adapted to close when the level of said holding pool rises above a preset level, and including a spill way formed in the dam and the elevation of the spill way above the head in said filter such that the filter is backwashed and cleaned by fluid passing from said holding pool through said filter outlet means to said filter.

2. A system according to claim 1 comprising an outlet sewer pipe connected to said filter chamber to establish the normal fluid level in said filter chamber above the level in said holding pool.

3. A system according to claim 2 wherein said inlet and outlet sewer pipes are connected to underground sewer systems.

4. A system according to claim 3 including a second dam downstream and formed with a filter chamber and the inlet sewer pipe for said second dam connected to the underground sewer system which is connected to the outlet sewer pipe of the upstream dam.

5. A system according to claim 1 wherein said valve means are pressure responsive.

6. A system according to claim 1 wherein said valve means comprise float controlled valve means.

* * * * *